June 15, 1937. C. H. GETZ 2,084,023
RUNNING BOARD COVER
Filed May 10, 1934
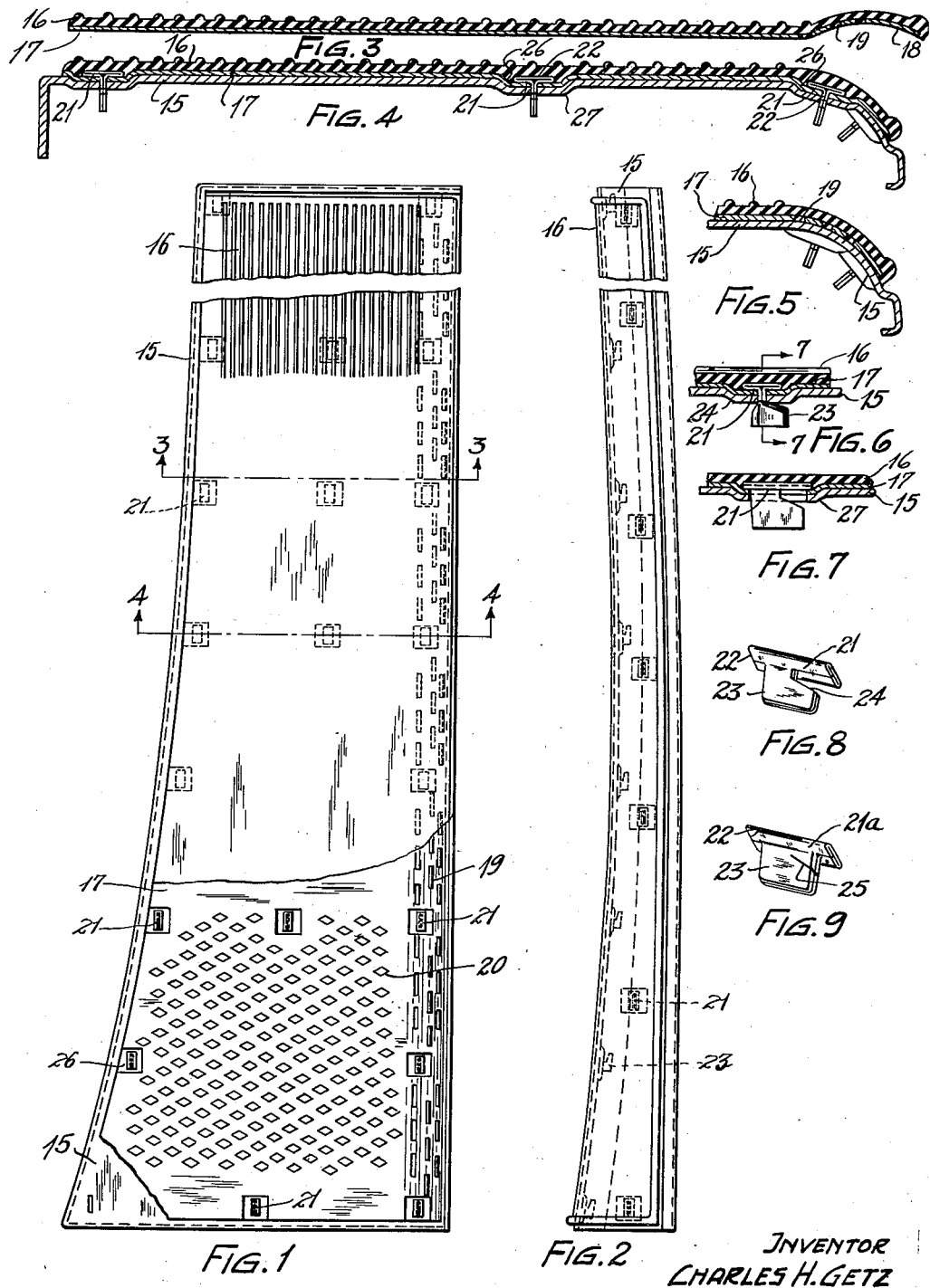
INVENTOR
CHARLES H. GETZ
Kuris, Hudson & Kent
ATTORNEYS Patented June 15, 1937

2,084,023

UNITED STATES PATENT OFFICE 2,084,023

RUNNING BOARD COVER

Charles H. Getz, East Cleveland, Ohio, assignor to The Ohio Rubber Company, Willoughby, Ohio, a corporation of Ohio Application May 10, 1934, Serial No. 724,939

3 Claims. (Cl. 280—169)

This invention relates to covers for automobile running boards and the like.

It has been customary practice in recent years, in fact almost universal practice, to cover automobile running boards with rubber which is vulcanized directly to the boards. The covering of running boards in this manner has proved to be very satisfactory in so far as permanence of attachment, wearing qualities, and appearance are concerned, but the recent stream-lining of automobiles has involved the use of deeply drawn and curved running boards, greatly increasing the cost of the molds used in vulcanizing the rubber to the running boards and in some instances making desirable the fastening of the covers to the running boards by mechanical fastening means.

The principal object of the present invention therefore is to provide a flexible cover molded from rubber or other suitable composition of a plastic nature and having provision for fastening or both reenforcing and fastening of such a nature that the cover can be made to conform with the irregular shape of the board and lie flat thereon over its entire area and be securely fastened thereto in a permanent manner.

The above and other objects are attained by the present invention which may be briefly summarized as consisting in certain novel details of construction and combinations and arrangements of parts which will be described in the specification and set forth in the appended claims.

In the accompanying sheet of drawings whereIn I have shown an embodiment of the invention which has proved quite satisfactory, Fig. 1 is a plan view of a running board, with portions broken away, to which my improved cover is applied;

Fig. 2 is an edge view of the same;

Fig. 3 is a transverse sectional view of the cover before it is shaped to and fastened to the running board proper;

Fig. 4 is a transverse sectional view of the running board and cover after the latter is attached thereto, the section being taken substantially along the line 4—4 of Fig. 1;

Fig. 5 is a fragmentary view of the front portion of Fig. 4, the section being taken on a different line;

Fig. 6 is a fragmentary sectional view showing how the shank of the clip used in attaching the cover to the board can be turned or twisted to draw the cover down tightly against the board;

Fig. 7 is a view along the line 7—7 of Fig. 6 before the shank of the clip is twisted;

Fig. 8 is a perspective view of the clip detached; and

Fig. 9 is a similar view showing a slight modification in the form of the clip.

Referring now to the drawing, 15 represents a typical sheet metal running board, the same being generally curved downwardly at the front, as shown at the righthand side of Fig. 4, and flanged downwardly at the rear and at its ends and also being curved lengthwise and otherwise to conform to the curves of other adjoining parts of the automobile. While the part or body to which my improved cover is adapted to be applied is generally an automobile running board, since it finds a considerable field of use for that purpose, the cover may be attached to other tread members or parts than running boards. Furthermore, while the tread portion of the cover is generally formed or composed of soft vulcanized rubber, the term "rubber" as used herein is intended to cover equivalent or like materials which are initially in plastic form.

My improved cover includes an upper layer 16 of soft vulcanized rubber or equivalent material, as above stated, and a metal reenforcement 17, in this instance a thin metal sheet, which is continuous from substantially end to end and side to side of the rubber layer except for certain perforations provided as hereinafter described. The reenforcement 17 may consist of a thin steel sheet of sufficient thinness so that the covering as a whole is flexible to a substantial degree. The rubber is molded and vulcanized to the upper side of the reenforcing sheet 17 and is thereby caused to adhere thereto over the entire surface of the sheet. The adherence is due to such inherent roughness as exists on the top of the reenforcing sheet, and may be augmented by the perforations which are in the sheet 17 to weaken it for flexing or bending purposes or by other perforations which may be provided in the sheet to provide mechanical interlocks between the rubber and the reenforcing sheet since all these openings will be filled with rubber.

In forming the cover, i. e., in molding the cover and vulcanizing it to a reenforcing sheet, the sheet and rubber may during the molding operation be entirely flat, and, as shown at the righthand portion of Fig. 3, a front portion such as shown at 18 may be molded on a curve to conform to the curvature of the front part of the running board 15 so as not to require any subsequent flexing in this portion, but where the cover is to be used with a board curved and flanged downwardly at the front edge to a considerable extent, as shown in Figs. 4 and 5, I provide a series of perforations 19 (see Fig. 1) extending preferably the full length of the board at the junction of this portion 18 with the flat portion of the cover so as to weaken the reenforcement at what may be termed the hinge line. Accordingly in applying a cover such as shown in Fig. 3 to the board shown in Fig. 4 the initially curved portion, which in itself does not add much to the cost of the mold, will be thrown or bent down, as illustrated in Figs. 4 and 5, with the curvature in the portion 18 forming a continuation of the curvature formed in flexing or bending the front portion downward, resulting in a continuous curve over the front portion of the running board, the same merging with the required smoothness with the flat part which lies over the top of the board. However, as stated above, the cover may be molded and vulcanized in flat condition, and the subsequent curving can be accomplished by bending the cover downward over the front curved part of the board, reliance being had on the perforations 19 which will cover such area of the board as to permit the smooth curving to the extent desired. Where other portions of the cover are to be curved to conform to curvatures of the board, the sheet is preferably provided with a group or groups of perforations 20 to admit of the necessary flexing to cause the cover to conform to the board curvatures without wrinkling either initially or later, so as to meet the most exacting requirements of automobile manufacturers and automobile users. It will be understood that the perforations 20 will be grouped wherever needed along the board.

The perforations 19 and 20 may be of any shape desired, such as round, square, diamond-shaped, or any other suitable shape, such as the elongated slots shown at 19. The cover is fastened to the running board mechanically by the use of fasteners or clips the heads of which are molded in the rubber so as to bear against the top surface of the reenforcing sheet, the clips having shanks which extend through slots in the sheet and are adapted to extend through slots in the running board and then bent or twisted to permanently and smoothly fasten the cover to the board. I prefer to use clips such as shown at 21 in Fig. 8 or at 21a in Fig. 9. These clips are formed of sheet metal, the flat elongated head portion 22 being formed by doubling the metal upon itself, and the shank portion 23 also formed of two thicknesses of metal. The shank of Fig. 7 has at the bottom a lateral extension with a beveled upper edge 24, the parts being so proportioned that when the cover is applied to the board with the shanks extending at least partially through the slots in the board, and when the shanks are turned or twisted in the manner indicated partially in Fig. 6, the upper beveled edge 24, by engagement with the lower surface of the board, has a camming action which pulls the cover down tightly against the top surface of the board. Instead of providing a notch in the shank 23, as in Fig. 8, the shank may be provided with an inclined slit 25. The clip shown in Fig. 9 has the advantage over that shown in Fig. 8 that there is less likelihood of rubber being forced down through the slot in the reenforcing sheet through which the shank extends during the molding and vulcanizing operation, as occurs sometimes when the shank is notched as in Fig. 8.

The reenforcing sheet is preferably, though not necessarily, provided with depressions 26 to accommodate the heads 22 of the clips so that the top surface of the heads will be at substantially the level of the top surface of the reenforcing sheet and thereby decrease the likelihood of the heads of the clips causing a humping of the rubber at the top surface of the cover. Likewise, the board may be depressed as shown at 27 in Fig. 4 and in Figs. 6 and 7 to receive the depressions if they are formed in the reenforcing sheet. The slots which are formed in the bases of the depressions 26 of the reenforcing sheet are just wide enough to permit the shanks of the clips to be extended therethrough so that in the molding and vulcanizing operation, during which the rubber sheet 16 is attached to the steel reenforcing sheet 17, very little if any rubber will be forced through the openings formed in the bottom of the mold to accommodate the shanks of the clips.

The clips will be located wherever necessary, the number and location thereof depending largely upon the shape and design of the cover and the flexing of curving which must be imparted to the cover to make it conform to and cause it to be securely held down against the board. As shown in Fig. 1, a series of clips are arranged along the rear edge, a series along the front edge, and a series through the middle. In any event, they will be numerous enough and so located as to cause the cover to lie tightly and smoothly against the surface of the board. The upper surface of the rubber 16 may be ribbed or have any desired configuration, ribbing being shown in this instance.

While I have shown only the preferred construction, I do not desire to be confined to the precise details shown but aim in my claims to cover all modifications which do not involve a departure from the spirit and scope of my invention.

Having thus described my invention, I claim:

1. A running board cover comprising an upper sheet of rubber, and a metal reenforcement to which the rubber is molded and vulcanized, the cover having its front portion molded with a predetermined curvature and the reenforcement having a bending line adjacent thereto whereby it may be made to conform to the curved front of a running board.

2. A cover adapted to be applied to a running board provided with a curved portion, comprising a sheet of rubber, and a reenforcing sheet to which the rubber sheet is molded and attached, said cover having a section thereof preformed to a curvature corresponding substantially with the curvature of said portion of the running board and having a weakened bending area increasing the flexibility of the cover adjacent said preformed section.

3. A cover adapted to be applied to a running board provided with a curved edge, comprising a sheet of rubber, and a reenforcing sheet to which the rubber sheet is molded and attached, said cover having a section along one edge thereof preformed to a curvature corresponding substantially with the curvature of said edge of the running board and having a perforated bending area increasing the flexibility of the cover adjacent the preformed section thereof.

CHARLES H. GETZ.